United States Patent
Davila et al.

[11] Patent Number: 6,059,861
[45] Date of Patent: May 9, 2000

[54] ENHANCED EXCLUSION FILTER

[75] Inventors: Marco A. Davila, Mesquite; Edward C. Fontana, Rockwall; Daniel M. Kolides, Mesquite, all of Tex.; Joyce E. Lingousky, Annandale; Xina Shu-Wen Quan, Bridgewater, both of N.J.

[73] Assignee: Lucent Technologies, Inc., Murray Hill, N.J.

[21] Appl. No.: 09/114,783

[22] Filed: Jul. 13, 1998

[51] Int. Cl.$^7$ ..................................................... B01D 21/26
[52] U.S. Cl. ................................. 95/270; 95/35; 96/392; 96/393; 55/385.6; 210/787
[58] Field of Search ................................. 55/385.1, 385.6, 55/402, 408, 409, 484, 489; 96/196, 392, 293; 95/35, 270; 210/488, 489, 498, 787

[56] References Cited

U.S. PATENT DOCUMENTS

| | | | |
|---|---|---|---|
| 1,267,024 | 5/1918 | Wedge | 96/392 |
| 2,850,169 | 9/1958 | Briggs | 96/392 |
| 2,874,849 | 2/1959 | Browne et al. | 96/393 |
| 3,209,915 | 10/1965 | Gutkowski | 96/393 |
| 3,903,646 | 9/1975 | Norton | 96/392 |
| 4,147,299 | 4/1979 | Freeman | 96/407 |
| 4,361,490 | 11/1982 | Saget | 95/270 |
| 4,632,755 | 12/1986 | DeGraffenried | 55/489 |
| 4,633,349 | 12/1986 | Beck et al. | 55/484 |
| 4,726,900 | 2/1988 | Keskinen et al. | 96/393 |
| 4,777,549 | 10/1988 | Dushkes et al. | 55/385.1 |
| 4,857,087 | 8/1989 | Bolton et al. | 55/385.6 |
| 4,863,499 | 9/1989 | Osendorf | 55/385.6 |
| 5,030,260 | 7/1991 | Beck et al. | 55/385.6 |
| 5,711,877 | 1/1998 | Gonzalez | 210/488 |
| 5,746,789 | 5/1998 | Wright et al. | 95/270 |

*Primary Examiner*—David A. Simmons
*Assistant Examiner*—Minh-Chau T. Pham
*Attorney, Agent, or Firm*—Locke Liddell & Sapp LLP

[57] ABSTRACT

The present invention relates to an enhanced exclusion filter having a cylindrical stack of substantially identical annular disks and a central rotating element. Each annular disk engages the rotating element by at least one strut which extends inward from the inner perimeter of the annular disk toward the central axis of the cylindrical stack. Protuberances extend from the annular disks and engage depressions in adjacent annular disks to maintain the spacing between adjacent annular disks. Dimples extending through the annular disks may be utilized to form a depression on one surface of an annular disk and a protuberance on the opposite surface of the annular disk. The annular disks are angularly offset by a fixed amount from the adjacent annular disks so that rough vane surfaces are formed by the struts of the annular disks. Preferably a pattern of substantially identical angular offsets is used. In the alternative, a pattern of angular offsets may be used in which series of small angular offsets are separated by large angular offsets in a direction opposite from the small angular offsets. Preferably, the design of the struts is modified so that the trailing and leading edges of the struts extend toward adjacent struts, forming more continuous vane surfaces. The present invention also relates to the use of exclusion filters as a means of providing a flow of fluid through electronics enclosures. The present invention also relates to the use of redundant pressurized enclosures comprising an enclosure casing, two exclusion filters, and two pressurizing means. The enclosure casing has a major orifice through which fluid enters the enclosure casing and a minor orifice through which fluid exits the enclosure casing. The pressurizing means discharge filtered and pressurized fluid in two discharge areas within the enclosure casings which are substantially opposite from one another.

7 Claims, 12 Drawing Sheets

A'-A

B'-B

ENHANCED EXCLUSION FILTER

TECHNICAL FIELD OF THE INVENTION

This invention relates to particulate filters, and more specifically, is concerned with a design improvements and methods of use for exclusion filters.

BACKGROUND OF THE INVENTION

The removal of solid particulates from liquid working or moving fluids, and the removal of solid particulates and liquid droplets from gaseous working or moving fluids is vital to the prevention of the fouling or erosion of heat, mass and momentum transfer surfaces. In the particular case of outdoor electronics enclosures, contaminants such as solid particulates, liquid droplets, and specifically salt "fogs" are especially problematic. When present in a cooling airflow these contaminants may foul heat sinks, thus preventing proper cooling of the electronics enclosure, and may short-circuit electronics, creating a fire-hazard and maintenance problem. In the past working and moving fluids were either sealed in a closed environment and, if necessary, cooled by the use of heat exchangers, or conventional screening filters were employed. Conventional filters require periodic maintenance, however, and heat exchangers are relatively expensive. Conventional filters have experienced particular difficulty when applied to electronics enclosures, due to a substantial inability to exclude small liquid droplets and fogs. An affordable, maintenance-free, self-cleaning filter system represents an appealing solution to the problem of particulate and liquid droplet contamination.

Exclusion filters are a relatively new development in the field of particulate filtration. Exclusion filters utilize a cylindrical stack of evenly-spaced substantially-flat annular disks which rotates about the stack's central axis. The stack is capped on one end, and the annular disks' concentric holes form a central core within the stack. When operating, fluid pressure is reduced within the core and unfiltered fluid enters the rotating stack's periphery though the spaces between the disks. The fluid exits the stack through the uncapped end of the central core. Exclusion filters operate on Boundary Layer Momentum Transfer methodology. The rotation of the disks establishes a boundary layer on each side of each disk in the stack. A pressure drop exists across the disk stack from outer to inner perimeter. Angular momentum transfer from the rotating disks via the inter-disk boundary layers in the device causes any particles above the critical cut-off size that are entrained in the incoming fluid to be immediately expelled away from the device perimeter. The fluid itself passes easily through the device. Exclusion filters are capable of filtering solid particulates and liquid droplets from a gas, or of filtering solid particulates from a liquid.

Cooling airflows within electronics enclosures have suffered from contamination which existing filtration systems could not adequately prevent. A need exists for a filtration system capable of excluding both solid particulates and liquid droplets, including fogs, from the cooling airflows within electronics enclosures. Prior exclusion filter systems have suffered from an unfortunate difficulty of manufacture. Prior exclusion filter designs have also required large stacks of flat annular disks, thus making the exclusions filters awkward and difficult to use. A need exists for an exclusion filter which is simple to manufacture, acceptable in size, and efficient. There is also a need for a redundant exclusion filter system capable of maintaining a flow of filtered fluid even when one exclusion filter fails. This invention fulfills these needs, and the enhanced exclusion filter systems represent an affordable, maintenance free, and self-cleaning alternative to existing filter systems.

SUMMARY OF THE INVENTION

The present invention provides an exclusion filter to meet the specific needs of outdoor electronics enclosures, and further provides an enhanced exclusion filter which meets the aforementioned filtering needs for a wide variety of applications. Exclusion filters represent a more effective mechanism than conventional filters for excluding solid particulates, fluid droplets, and fog from the cooling airflow in outdoor electronics enclosures. Enhanced exclusion filters also improve upon existing exclusion filter technology by several methods appropriate for a wide variety of applications. First, the enhanced exclusion filter's construction from substantially identical flat annular disks simplifies manufacturing of the filter. The supporting structure required for the exclusion filter is also reduced to a single shaft onto which all exclusion filter components may be directly or indirectly attached. Manufacturing can be further simplified by incorporating inter-disk spacing and angular offset controls within the design of the annular disks. In a preferred embodiment, protuberances extending from the surface of the annular disks serve as these controls, and dimples offer one example of acceptable protuberances. The simplification of the manufacturing process advantageously reduces the cost of manufacture.

Second, the enhanced exclusion filter design improves the efficiency of the filter's operation. The efficiency is improved by using annular disks of non-uniform thickness to improve flow rates through the filter while maintaining acceptable separation efficiency. Modifications include tapering the annular disks' thickness toward both the inner and outer perimeters of the annular disks. In a preferred embodiment, the tapering of adjacent annular disks forms a diffuser pattern between the annular disks. Advantageously, the use of tapering can reduce the height of the stack of annular disks. The reduction in the height of the stack of annular disks increases the practicability of using low-cost mass manufacturing techniques, such as plastic injection molding, which would utilize relatively large annular disk thicknesses. The efficiency is further improved by modifying the cross-section of the annular disk struts and controlling the angular offsets between the annular disks to form one or more vane surfaces within the central core of the stack of annular disks. Advantageously, the existence of these vane surfaces promotes the rotation of the stack when fluid flows through the filter, and reduces the power required to achieve the necessary angular velocity in the stack.

Third, reliability is improved by employing a redundant ducted exclusion filter system. In a redundant ducted exclusion filter system, two exclusion filters are utilized and the filtered fluid discharged by one exclusion filter is channeled to the region of the system served which is substantially opposite from the discharge of the second exclusion filter. Advantageously, the redundant ducted exclusion filter system ensures a flow of filtered fluid across the system served even upon the failure of one of the exclusion filters. Use of the redundant ducted exclusion filter system may be particularly advantageous when used with electronics enclosures.

BRIEF DESCRIPTION OF THE DRAWINGS

For a more complete understanding of the present invention, and the advantages thereof, reference is now made to the following Detailed Description of the Invention taken in conjunction with the accompanying drawings in which.

DETAILED DESCRIPTION OF THE INVENTION

Figure 1A:
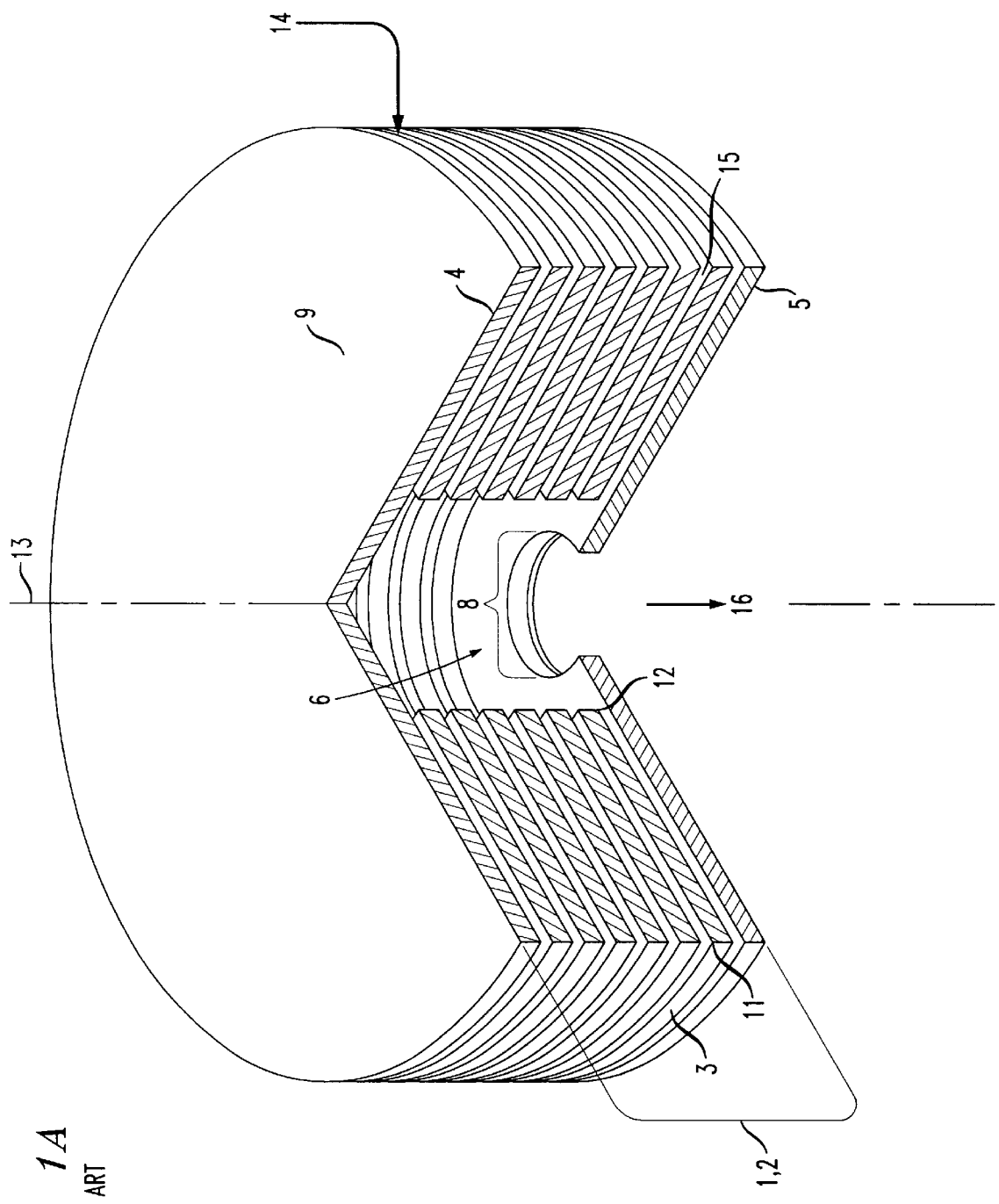
FIG. 1A is a perspective cut-away view demonstrating an assembled exclusion filter.

The present invention and its advantages are best understood by referring to the drawings, like numerals being used for like and corresponding parts of the various drawings.

Figure 1B:
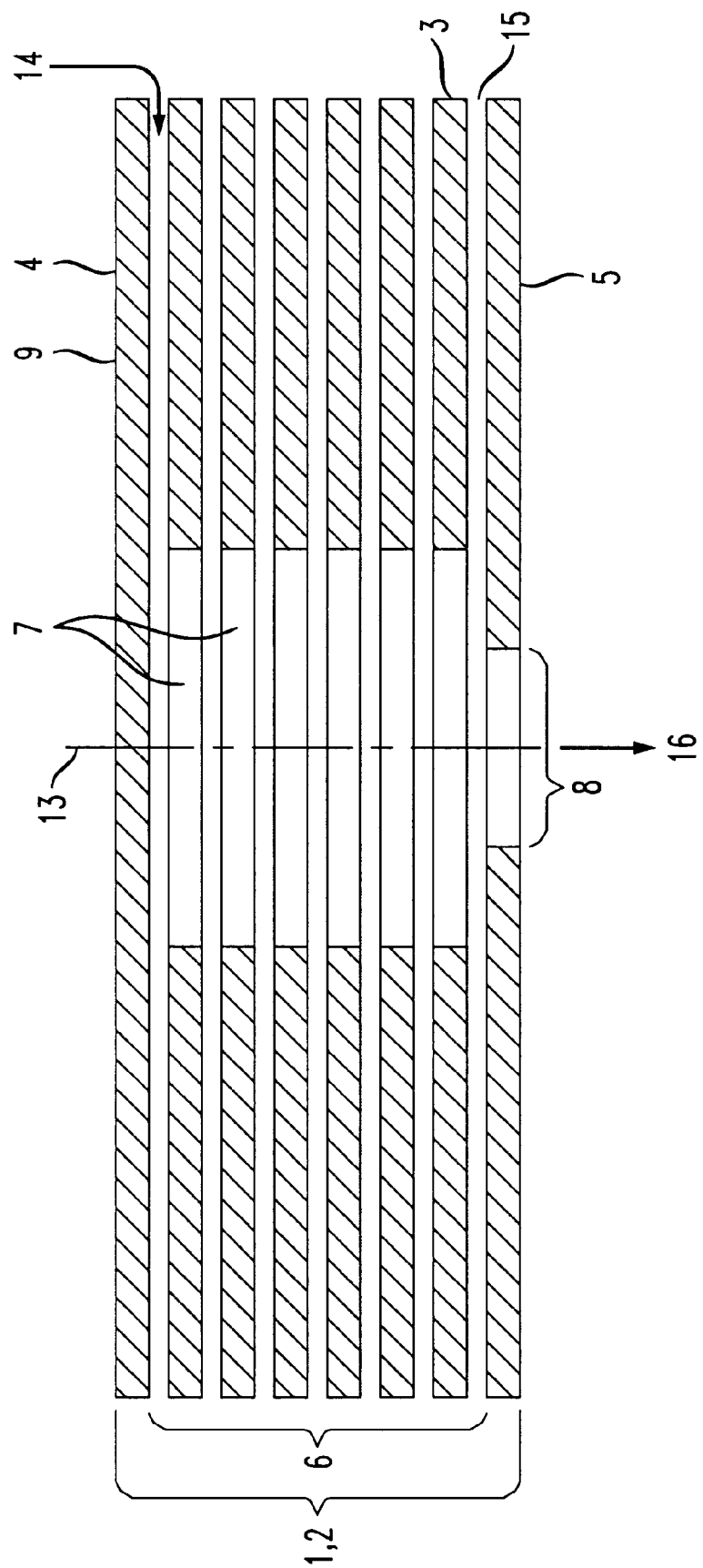
FIG. 1B is a cross-section demonstrating an assembled exclusion filter.

In FIGS. 1A and 1B there is shown an assembled exclusion filter 1. Exclusion filter 1 includes a cylindrical stack 2 of evenly spaced flat annular disks 3, a capped end plate 4 and an orifice end plate 5, a central core 6 formed by the central holes 7 of annular disks 3, orifice end plate 5 containing a filter orifice 8, capped end plate 4 having an outer surface 9, and annular disks 3 having an outer perimeter 11 and an inner perimeter 12. When operating exclusion filter 1 is rotated about its central axis 13, and unfiltered fluid 14 enters rotating stack 2 through inlet spaces 15 between disks 3. Filtered fluid 16 then flows into central core 6, and exits stack 2 through filter orifice 8.

Exclusion filters 1 offer special advantages in the field of electronics enclosures, and particularly outdoor electronics enclosures. Electronics enclosures require a cooling mechanism to prevent overheating of the electronic components they contain. However, any contaminants contained within the airflow used to cool the electronics may cause serious problems. Solid particulates may foul heat sinks and prevent proper heat transfer to the cooling airflow, and liquid droplet contaminants, particularly salt "fogs," can cause electrical shorts and represent a fire hazard. It is difficult for existing conventional media filters to exclude liquid droplet contaminants without clogging, and heat exchangers are often too expensive to serve as an attractive alternative. Exclusion filters 1 are more affordable than heat exchangers, and advantageously filter both solid particulates and liquid droplets from gaseous fluids without clogging.

The process for cooling electronics housed within an electronics enclosure with the aid of an exclusion filter comprises three major steps. The cooling fluid must be filtered through an exclusion filter. The cooling fluid must also be pressurized by a pressurizing means. Finally, the pressurized filtered cooling fluid must be discharged within the electronics enclosure. It is to be understood that the filtering of the cooling fluid may occur before, after, or during the pressurizing of the cooling fluid, and that the scope of this invention is not limited to any particular order of filtering and pressurization. The pressurizing means utilized to pressurize the cooling fluid may be a fan, blower, pump, or compressor, though it is to be understood that other pressurizing means would also be acceptable for the purposes of this invention.

Figure 2:
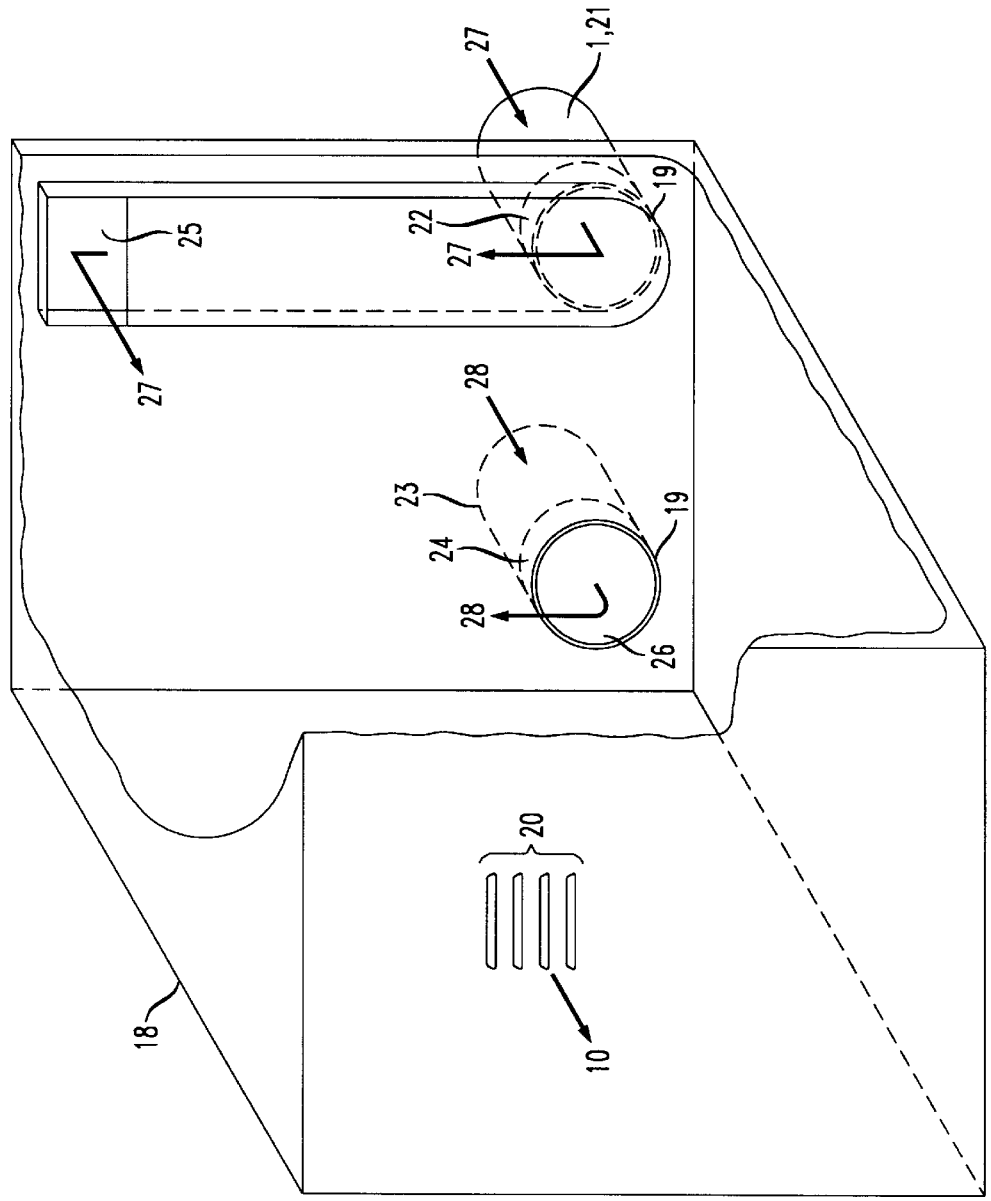
FIG. 2 is a perspective cut-away view illustrating a redundant ducted exclusion filter system.

In FIG. 2 there is shown a redundant pressurized enclosure system. The redundant pressurized enclosure system utilizes a pair of exclusion filters 1 to ensure a flow of filtered fluid 10 across the interior of an enclosure casing 18. Though appropriate for electronics enclosures, it is to be understood that the application of this invention is not limited to electronics enclosures. Enclosure casing 18 contains at least one major orifice 19 through which to receive fluid and at least one minor orifice 20 through which fluid may exit enclosure casing 18. Though in FIG. 2 vents serve as minor orifices 20, it is to be understood that this invention is not limited to embodiments in which vents serve as minor orifices 20. In some cases minor orifices 20 may be inherently present from the construction of the enclosure casing 18. For example, seams or cracks along adjoining surfaces of enclosure casing 18 may serve as minor orifices 20.

Fluid discharged into enclosure casing 18 must first be pressurized and filtered to remove contaminants. A first exclusion filter 21 filters fluid, and a first pressurizing means 22 pressurizes the fluid filtered by first exclusion filter 21. A second exclusion filter 23 also filters fluid, and a second pressurizing means 24 pressurizes the fluid filtered by second exclusion filter 23. The pressurized filtered fluid from first pressurizing means 22 is discharged into a first discharge area 25 within enclosure casing 18. The pressurized filtered fluid from second pressurizing means 24 is discharged into a second discharge area 26 within enclosure casing 18. First discharge area 25 and second discharge area 26 are located substantially opposite from one another within enclosure casing 18. The first fluid stream 27 comprises the fluid filtered by first exclusion filter 21, pressurized by first pressurizing means 22 and discharged into first discharge area 25. The second fluid stream 28 comprises the fluid filtered by second exclusion filter 23, pressurized by second pressurizing means 24 and discharged into second discharge area 26.

First fluid stream 27 and second fluid stream 28 enter enclosure casing 18 through major orifices 19. Several different arrangements for fluid stream entry into enclosure casing 18 are acceptable. Fluid streams may enter enclosure casing 18 prior to filtering, following filtering but prior to pressurization, or following both filtering and pressurization. The two fluid streams may enter the enclosure casing 18 through one major orifice 19 or each fluid stream may enter enclosure casing 18 through a separate major orifice 19. If the two fluid streams enter through the same major orifice 19 at least one fluid stream must then be channelled away from the orifice prior to discharge to ensure that first discharge area 25 is located substantially opposite from second discharge area 26. If the two fluid streams enter enclosure casing 18 through different major orifices 19, it still may be necessary to channel one or both fluid streams to ensure that first discharge area 25 is located substantially opposite from second discharge area 26.

When both pressurizing means and both exclusion filters are properly functioning, the filtered pressurized fluid travels from first discharge area 25 and second discharge area 26, across the enclosure casing 18, and exits enclosure casing 18 through minor orifices 20. When one fluid stream fails a short-circuit may occur, in which the discharged fluid from the functioning fluid stream exits the system through the major orifice of the non-functioning fluid stream, without passing across a substantial portion of enclosure casing 18. The arrangement of first discharge area 25 at a location with enclosure casing 18 substantially opposite from second discharge area 26 ensures that the fluid flow will pass across a substantial portion of the interior of enclosure casing 18, and therefore not create a problematic short-circuit.

Arrangements of discharge areas which satisfy the "substantially opposite" arrangement include: (1) discharge areas being located on opposite ends of the same side of enclosure casing 18; (2) discharge areas being located on opposite corners of the same side of enclosure casing 18; (3) discharge areas being located on opposite sides of enclosure casing 18. It is to be understood, however, that this invention is not limited to the three offered discharge area arrangements, and that any arrangement which ensures fluid flow across a significant fraction of enclosure casing 18 despite the failure of one fluid stream satisfies the "substantially opposite" requirement.

In the preferred embodiment illustrated in FIG. 2, the discharge areas are located on opposite corners of one side of enclosure casing 18, and minor orifices 20 are located on the opposite side of enclosure casing 18. A duct is also used to channel one fluid stream from a major orifice 19 to the appropriate discharge area.

FIG. 2 also illustrates one example of the process for cooling electronics housed within an electronics enclosure with the aid of an exclusion filter, in which enclosure casing 18 serves as the electronics enclosure and the filtered fluid is utilized for cooling. The cooling fluid is filtered through the first exclusion filter 21 and second exclusion filter 23, is pressurized by first pressurizing means 22 and second pressurizing means 24, and is discharged within enclosure casing 18 at first discharge area 25 and second discharge area 26. Thus all three steps of the process are satisfied.

Figure 3:
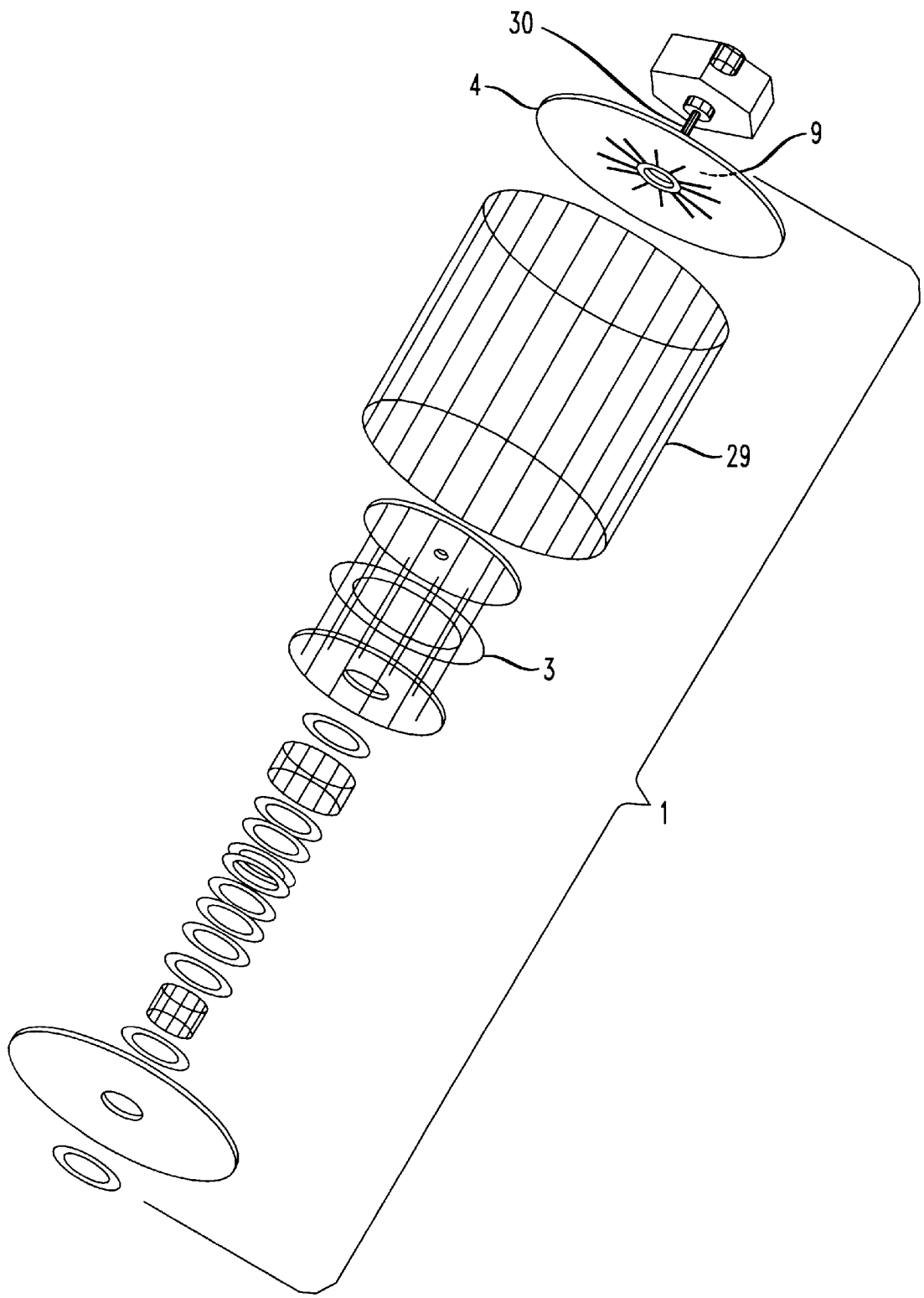
FIG. 3 is a perspective exploded view demonstrating an exclusion filter design of the prior art.

In FIG. 3 there is shown one example of a disassembled exclusion filter 1 of the prior art. This exploded view demonstrates the complexity of existing exclusion filter 1 design and the multitude of parts utilized in such designs. Annular disks 3 within the demonstrated design are positioned within a wire-frame cage 29. A rotating element 30, which powers the rotation of exclusion filter 1, engages exclusion filter 1 on outer surface 9 of capped end plate 4.

Figure 4:
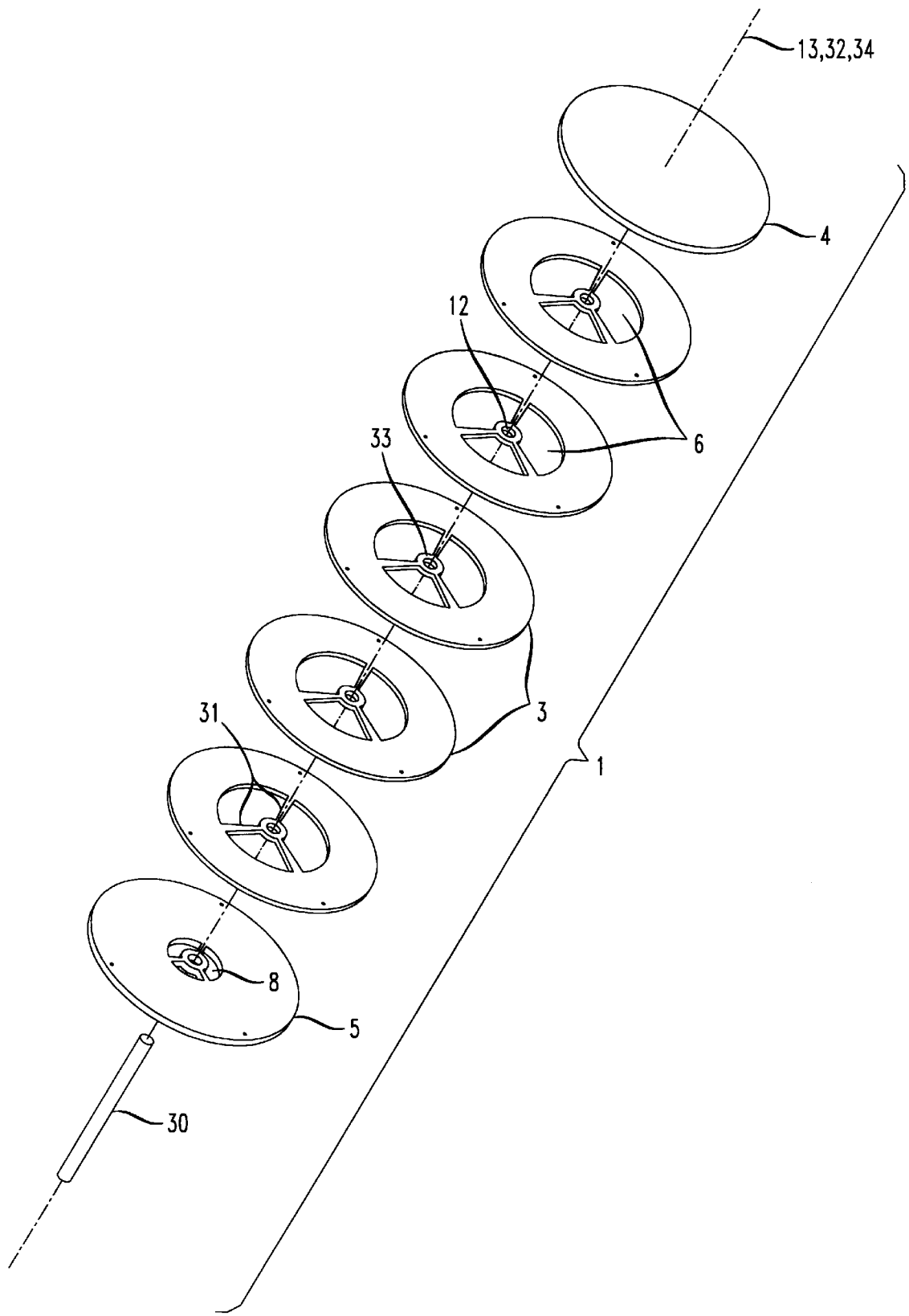
FIG. 4 is a perspective exploded view demonstrating an enhanced exclusion filter using substantially identical angular disks.

In FIG. 4 there is shown a disassembled exclusion filter 1 of the present invention. The design of exclusion filter 1 has been modified to include a central rotating element 30 which extends into central core 6. The annular disks 3 utilized in the modified design are substantially identical and include one or more struts 31 which extend inward from inner perimeter 12 and engage rotating element 30. In the preferred embodiment, annular disks 3 include a plurality of struts 31. Both capped end plate 4 and orifice end plate 5 also engage the rotating element 30, or in the alternative, one or both of said end plates may engage the annular disk 3 immediately adjacent to said end plate. It is to be understood that this invention encompasses exclusion filter 1 designs in which the annular disks 3 immediately adjacent to capped end plate 4 and orifice end plate 5 are not substantially identical to the remainder of annular disks 3. The structure required to support the exclusion filter is thus reduced to a single rotating element 30, onto which all exclusion filter components may be directly or indirectly attached.

Struts 31 of annular disks 3 engage rotating element 30, and orifice end plate 5 and capped end plate 4 engage either rotating element 30 or an annular disk 3, in a manner such that the plane of each end plate and annular disk 3 is perpendicular to axis of rotation 32, and such that the central axis 13 of the exclusion filter 1 is substantially co-linear with axis of rotation 32. Struts 31 of annular disks 3 engage rotating element 30 in one of two manners, rigidly or non-rigidly. When struts 31 are non-rigidly engaged to rotating element 30, the position of the center 33 of annular disk 3 is fixed on a line 34 substantially co-linear with central axis 13, and may be limited to a particular point on line 34, but annular disk 3 is substantially free to rotate about rotating element 30. When struts 31 are rigidly engaged to rotating element 30, the position of the center 33 of annular disk 3 is fixed to a particular point on line 34, and annular disk 3 is not free to rotate about rotating element 30. When struts 31 non-rigidly engage rotating element 30, another method must be utilized to transfer the rotation of rotating element 30 to annular disk 3. In one acceptable method, annular disk 3 engages an adjacent annular disk 3 whose struts 31 do rigidly engage rotating element 30. In a preferred method, capped end plate 4 and orifice end plate 5 rigidly engage rotating element 30, the annular disk 3 adjacent to capped end plate 4 engages capped end plate 4, the annular disk 3 adjacent to orifice end plate 5 engages orifice end plate 5, and all annular disks 3 engage each adjacent annular disk 3.

Figure 5:
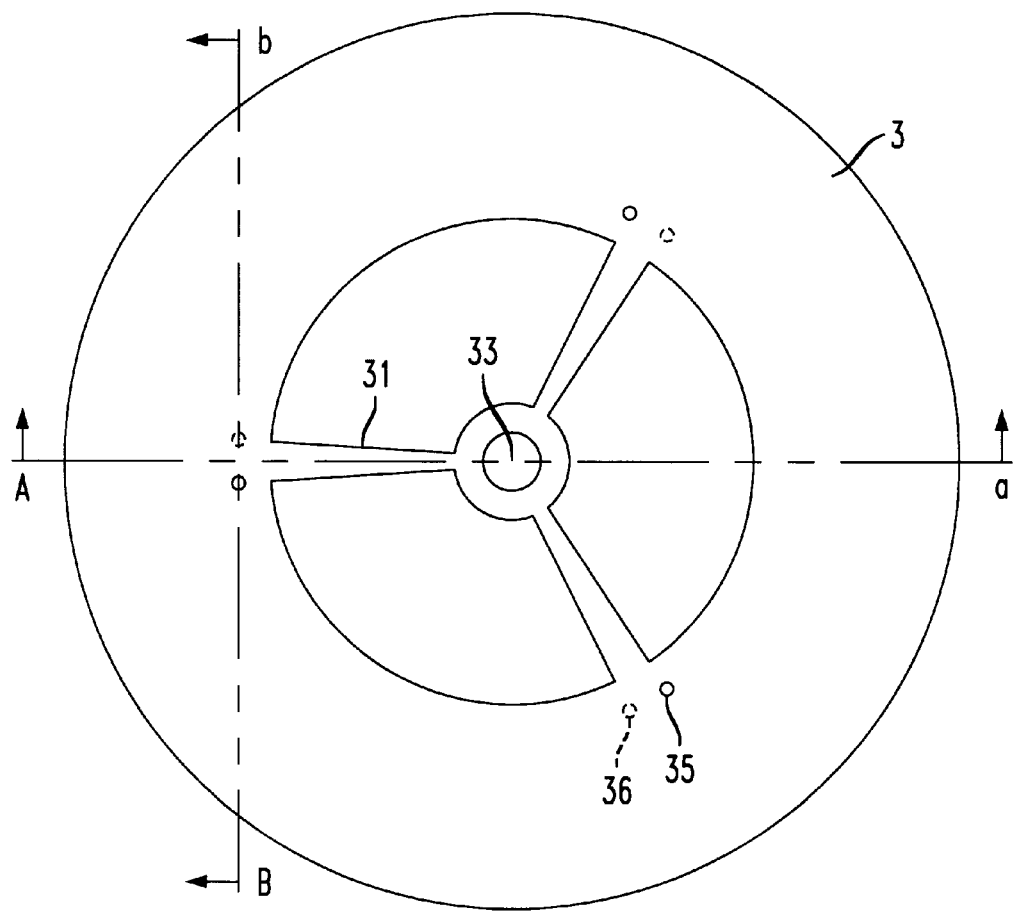
FIG. 5 provides a top view and two cross-sections demonstrating a single annular disk incorporating dimples and protuberances.
Figure 5:
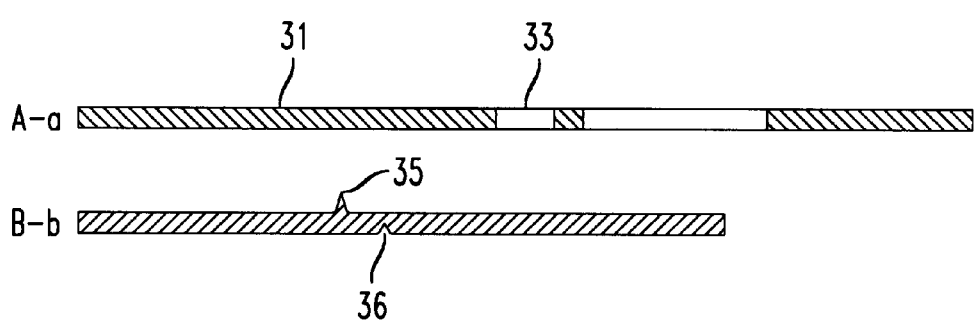

In FIG. 5 there is shown one example of an annular disk 3 which incorporates a plurality of protuberances 35. Protuberances 35 extend a fixed distance from annular disk 3 in a direction substantially perpendicular to the plane of annular disk 3 and contact the adjacent annular disk 3. Advantageously, protuberances 35 serve to maintain the proper inter-disk spacing between adjacent annular disks 3. Protuberances 35 may be located at any point on the surface of annular disk 3. In a preferred embodiment, protuberances 35 are positioned in a radially symmetric pattern on one side of annular disk 3, and are equidistant from center 33 of annular disk 3.

FIG. 5 illustrates an annular disk 3 which also incorporates a plurality of depressions 36. Depressions 36 on the surface of annular disk 3 are positioned in a pattern which mirrors the pattern of protuberances 35 on the facing surface of adjacent annular disk 3, such that the protuberances 35 of one annular disk 3 may be inserted into the depressions 36 of the adjacent annular disk 3. Depressions 36 and protuberances 35 may serve to engage adjacent annular disks 3. Thus the utilization of depressions 36 is particularly advantageous when struts 31 non-rigidly engage rotating element 30. In a preferred embodiment, the protuberances 35 on one annular disk 3 are inserted into the depressions 36 of an adjacent disk 3, and compression directed parallel to central axis 13 holds the position of the adjacent annular disks 3 relative to each other. To avoid the need for compression, the design of the depressions 36 and protuberances 35 may be modified so that once inserted into a depression 36 a protuberance 35 locks into place. A system of protuberances 35 and depressions 36 can also be utilized to engage capped end plate 4 or orifice end plate 5 to adjacent annular disks 3.

In a preferred embodiment, depressions 36 on one side of an annular disk 3 extend through the annular disk 3 and form protuberances 35 on the opposite side of the annular disk 3. Such protuberance/depression combinations, or dimples (not illustrated), are especially advantageous when utilized on annular disks 3 constructed from metal, in that a single "punch" performed upon the annular disk 3 during manufacture may form both protuberance 35 and depression 36. Though this advantage is best realized on metal annular disks 3, it is to be understood that this invention is not limited to annular disks 3 constructed from metal.

Protuberances 35 and depressions 36 may also be used to maintain inter-disk spacing and the position of annular disk 3 within cylindrical stack 2 in embodiments of annular disks 3 which do not incorporate struts 31. For example, orifice end plate 5 and capped end plate 4 may rigidly engage rotating element 30, and some or all annular disks 3 between the two end plates may rely solely on compression or locking engagement to adjacent annular disks 3 or end plates to maintain inter-disk spacing and annular disk 3 position within cylindrical stack 2.

In FIGS. 6A, 6B, 6C, 7A, 7B, and 7C there are shown exclusion filters 1 of the present invention in which angular offsets 38 between adjacent disks 3 are utilized to improve exclusion filter 1 performance. Angular offsets 38 may be achieved through the use of protuberances 35 and depressions 36 by offsetting the pattern of protuberances 35 on the surface of annular disk 3 a fixed amount about axis of rotation 32 from the pattern of depressions 36 on the opposite surface of annular disk 3. Though angular offsets 38 may be achieved through the use of protuberances 35 and depressions 36, it is to be understood that angular offsets 38 may be achieved through other means and that this invention is not limited to angular offsets 38 achieved through the use of protuberances and depressions. When the angular offsets 38 are utilized, the struts 31 of the annular disks 3 form one or more rough vane surfaces 39. Passive exclusion filters 1 are those in which the rotation of the exclusion filter 1 is achieved solely as a result of the flow of filtered fluid 16 through the exclusion filter 1. In passive exclusion filters 1 the impact of filtered fluid 16 upon vane surfaces 39 advantageously promotes the rotation of the exclusion filter 1. Powered exclusion filters 1 are those which rely, at least in part, upon sources other than the flow of filtered fluid 16 through the exclusion filter 1 to achieve rotation. In powered exclusion filters 1 the rotation of vane surfaces 39 advantageously promotes fluid flow through exclusion filter 1, thereby reducing the power required to operate exclusion filter 1.

Figure 6A:
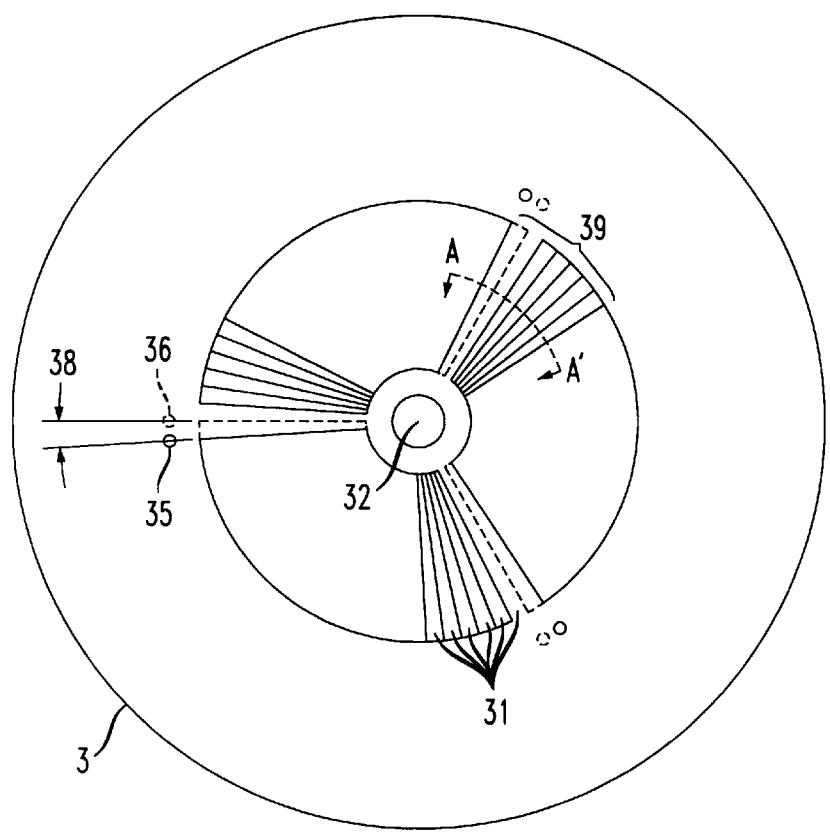
FIG. 6A is a top view demonstrating a cylindrical stack of six annular disks utilizing substantially identical angular offsets.
Figure 6B:
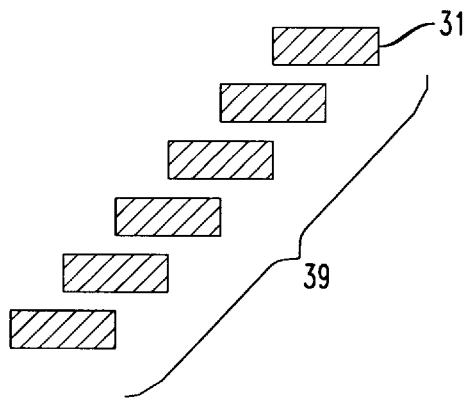
FIG. 6B is a cross-section through the struts of a cylindrical stack of six annular disks utilizing substantially identical angular offsets.
Figure 6C:
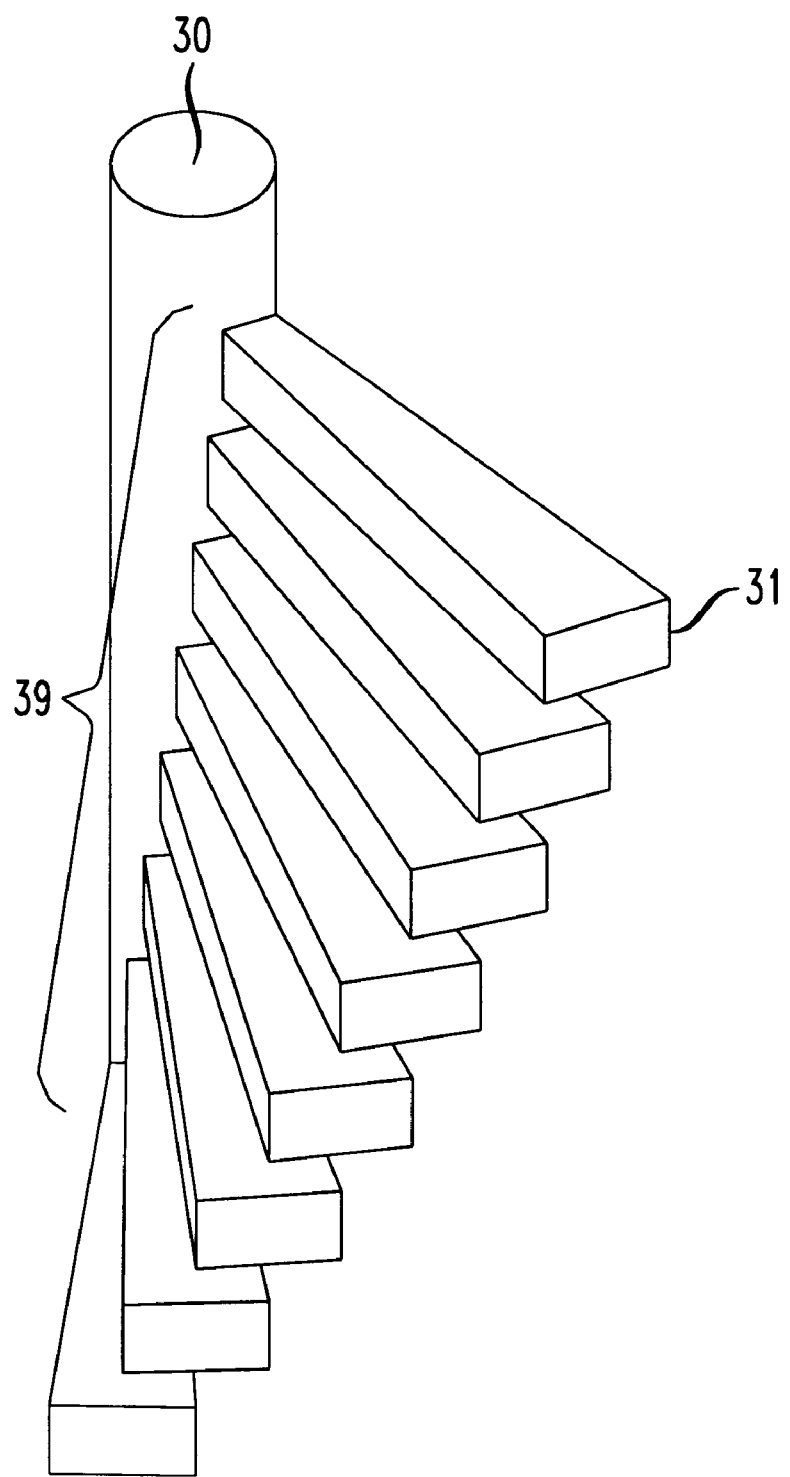
FIG. 6C is a perspective view of a rotating element and a series of engaged struts from a cylindrical stack of annular disks utilizing substantially identical angular offsets.
Figure 7A:
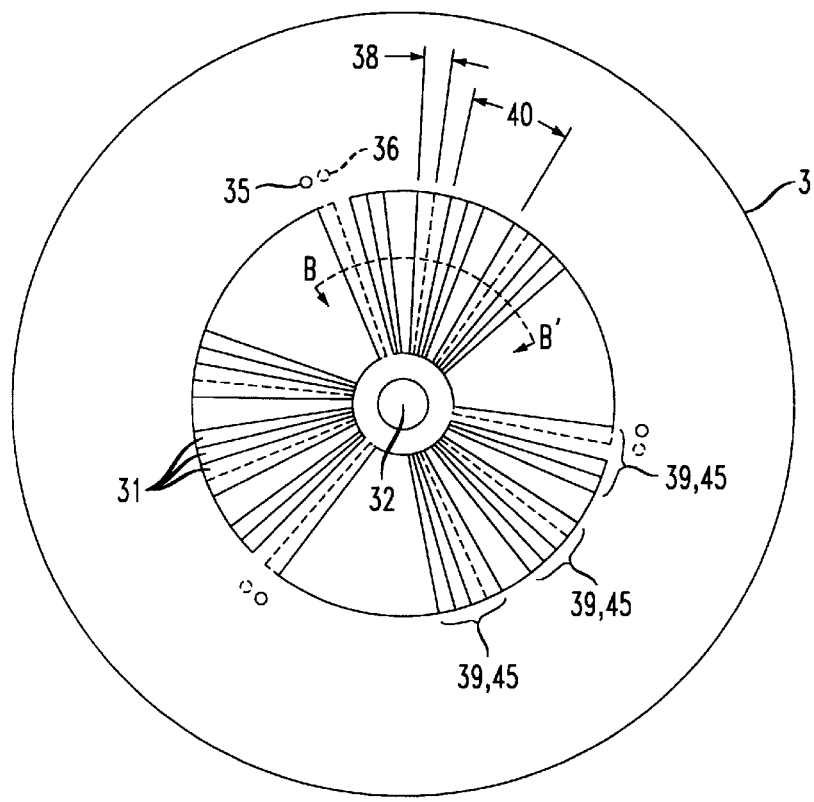
FIG. 7A is a top view demonstrating a cylindrical stack of nine annular disks utilizing an alternate pattern of angular offsets.
Figure 7B:
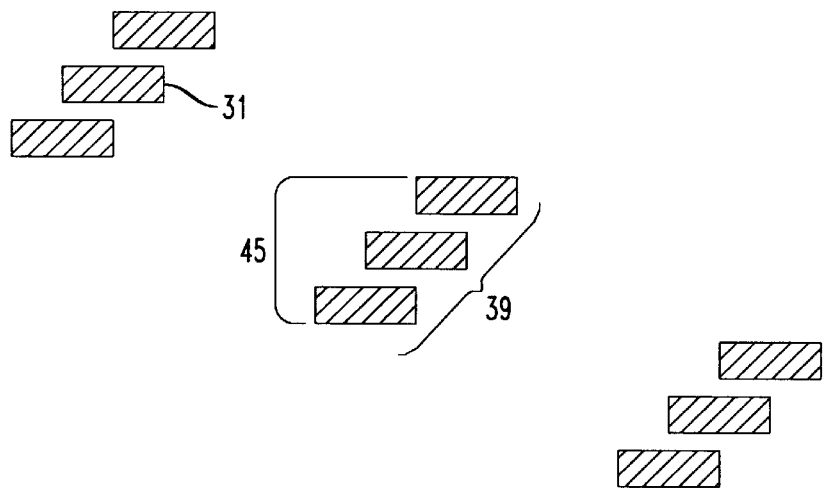
FIG. 7B is a cross-section through the struts of a cylindrical stack of nine annular disks utilizing an alternate pattern of angular offsets.
Figure 7C:
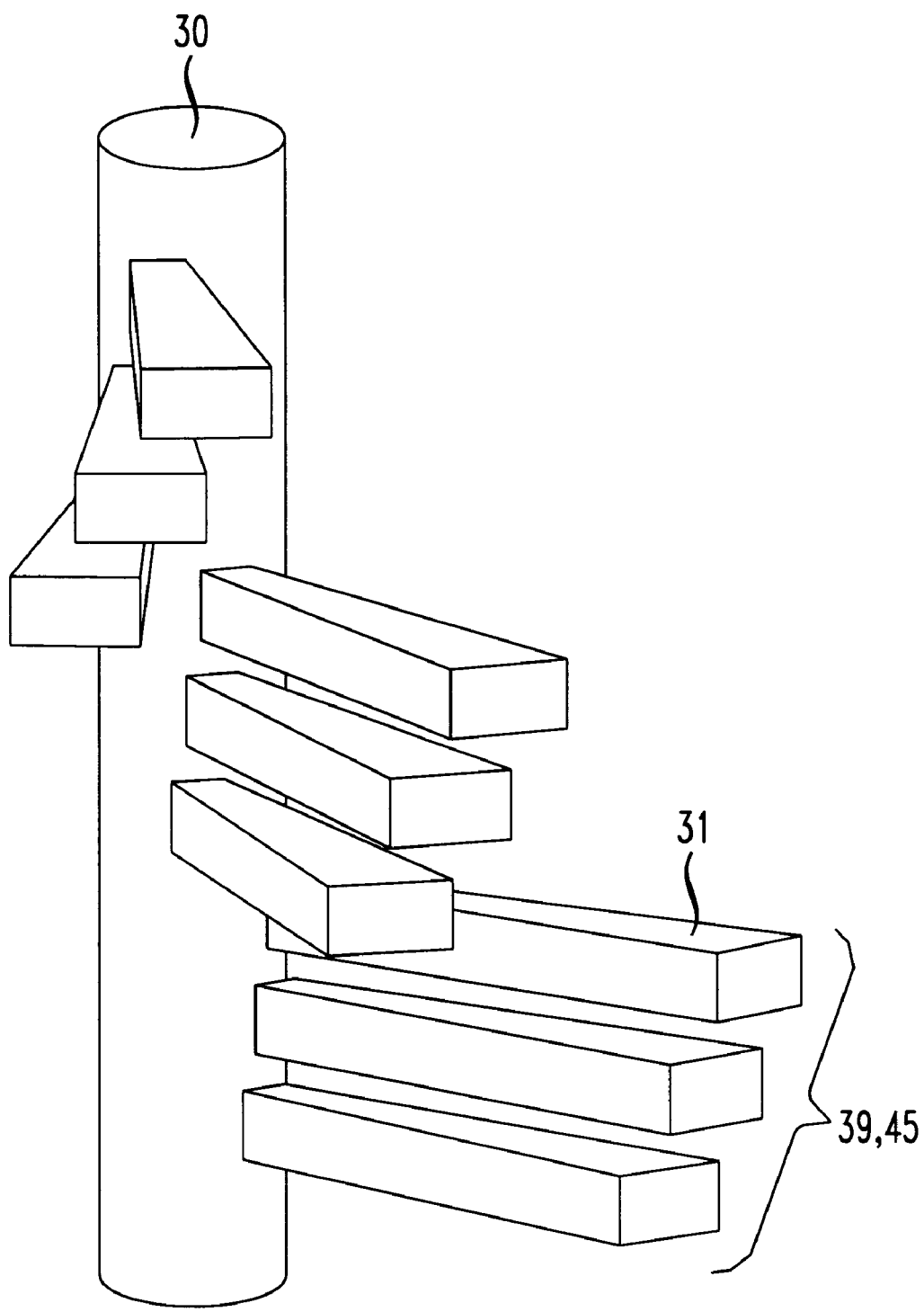
FIG. 7C is a perspective view of a rotating element and a series of engaged struts from a cylindrical stack of annular disks utilizing an alternate pattern of angular offsets.

In preferred embodiments, one of two patterns of angular offsets 38 are utilized. FIGS. 6A, 6B, and 6C illustrate the first preferred pattern of angular offsets 38, in which all the angular offsets 38 between the annular disks 3 are substantially identical in degree and direction. Vane surfaces 39 in exclusion filters 1 utilizing the first preferred pattern of angular offsets 38 thus form continuous Archimedes Screw configurations, and the number of vane surfaces 39 is equal to the number of struts 31 per annular disk 3. FIGS. 7A, 7B, and 7C illustrate the second preferred pattern of angular offsets 38, in which series 45 of substantially identical angular offsets 38 are separated by single, larger angular offsets 40 in the opposite direction (i.e. if the series 45 of offsets are in a clockwise direction, the larger angular offset 40 is in a counter clock-wise direction). The number of vane surfaces 39 per series 45 of substantially identical angular offsets 38 is equal to the number of struts 31 per annular disk 3, and the total number of vane surfaces 39 is equal to the multiple of the number of struts 31 per annular disk 3 and the number of series 45 of substantially identical angular offsets 38. Each series 45 of substantially identical angular offsets 38 must be applied among a group of at least two annular disks 3, and are preferably applied among a group of at least three annular disks 3.

Figure 8:
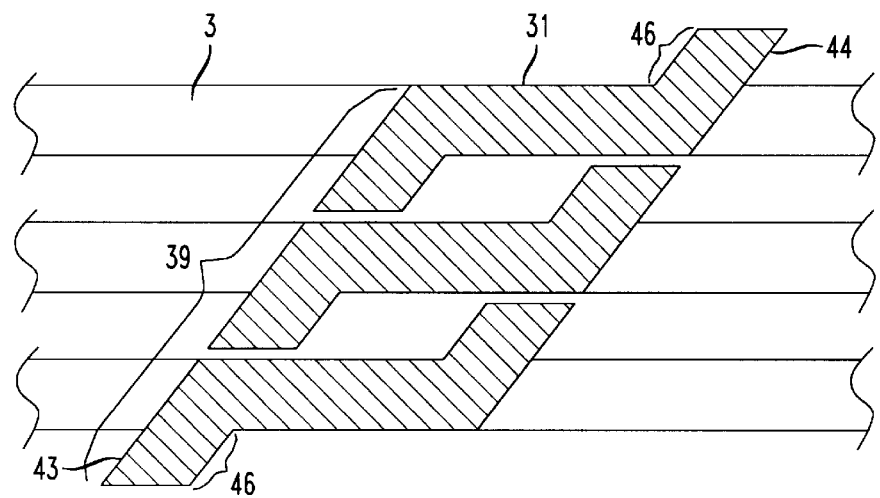
FIG. 8 is a cross-section through the struts of a cylindrical stack of three annular disks demonstrating a modified strut design appropriate for annular disks constructed from injection molded plastic.
Figure 9:
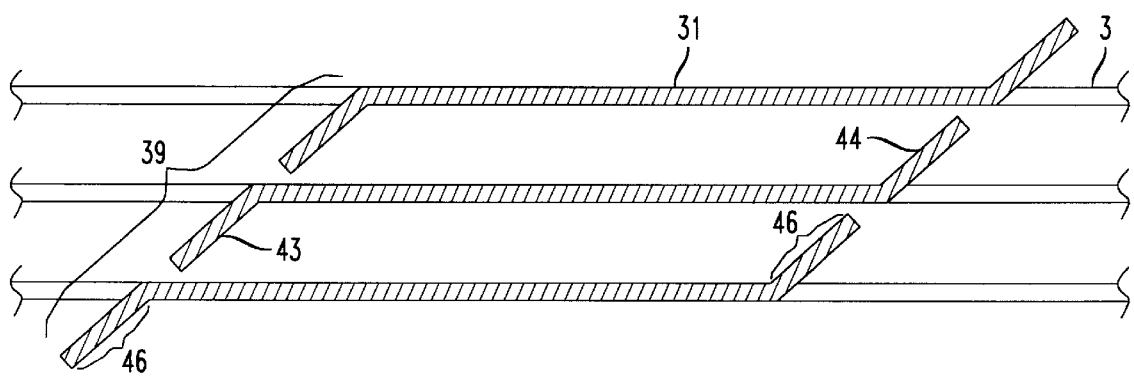
FIG. 9 is a cross-section through the struts of a cylindrical stack of three annular disks demonstrating a modified strut design appropriate for annular disks constructed from metal.

The effectiveness of vane surfaces 39 can be improved by modifying the cross-sectional design of struts 31. In modified strut 31 designs the struts 31 extend toward adjacent struts 31, thus reducing the size of the gap 41 between adjacent struts 31, and forming a more continuous vane surface 39. Different methods of modification may be necessary for struts 31 constructed from different materials. FIG. 8 illustrates a modified strut 31 design appropriate for struts 31 constructed from injection molded plastic. To ensure a uniform rate of hardening throughout an injection molded plastic annular disk 3, it may be necessary to maintain substantially uniform plastic thickness at substantially all points on the annular disk 3. FIG. 9 illustrates a modified strut 31 design appropriate for struts 31 constructed from a metal. In both modified designs, the leading edge 43 of strut 31 extends toward the leading edge 43 of a strut 31 of an adjacent annular disk 3, and the trailing edge 44 of strut 31 extends toward the trailing edge 44 of a strut 31 of the opposite adjacent annular disk 3. Though FIGS. 8 and 9 illustrate examples wherein both leading edge 43 and trailing edge 44 extend toward struts 31 of adjacent annular disks 3, it is to be understood that this invention encompasses designs in which only leading edge 43 or trailing edge 44 extend toward a strut 31 of an adjacent annular disk 3. The design illustrated in FIG. 9 may be achieved by either forming the struts 31 with the extensions 46 as shown, or by bending the leading edge 43 or trailing edge 44 of pre-formed struts 31.

In a preferred embodiment, the simplicity of construction advantageously offered by the aforementioned improved exclusion filter 1 designs is further realized by forming annular disks 3, including struts 31 and protuberances 35, from a single piece of construction material. Construction materials which may be utilized include, but are not limited to: injection molded plastic, stamped metal, molded metal, and machined metal.

Figure 10:
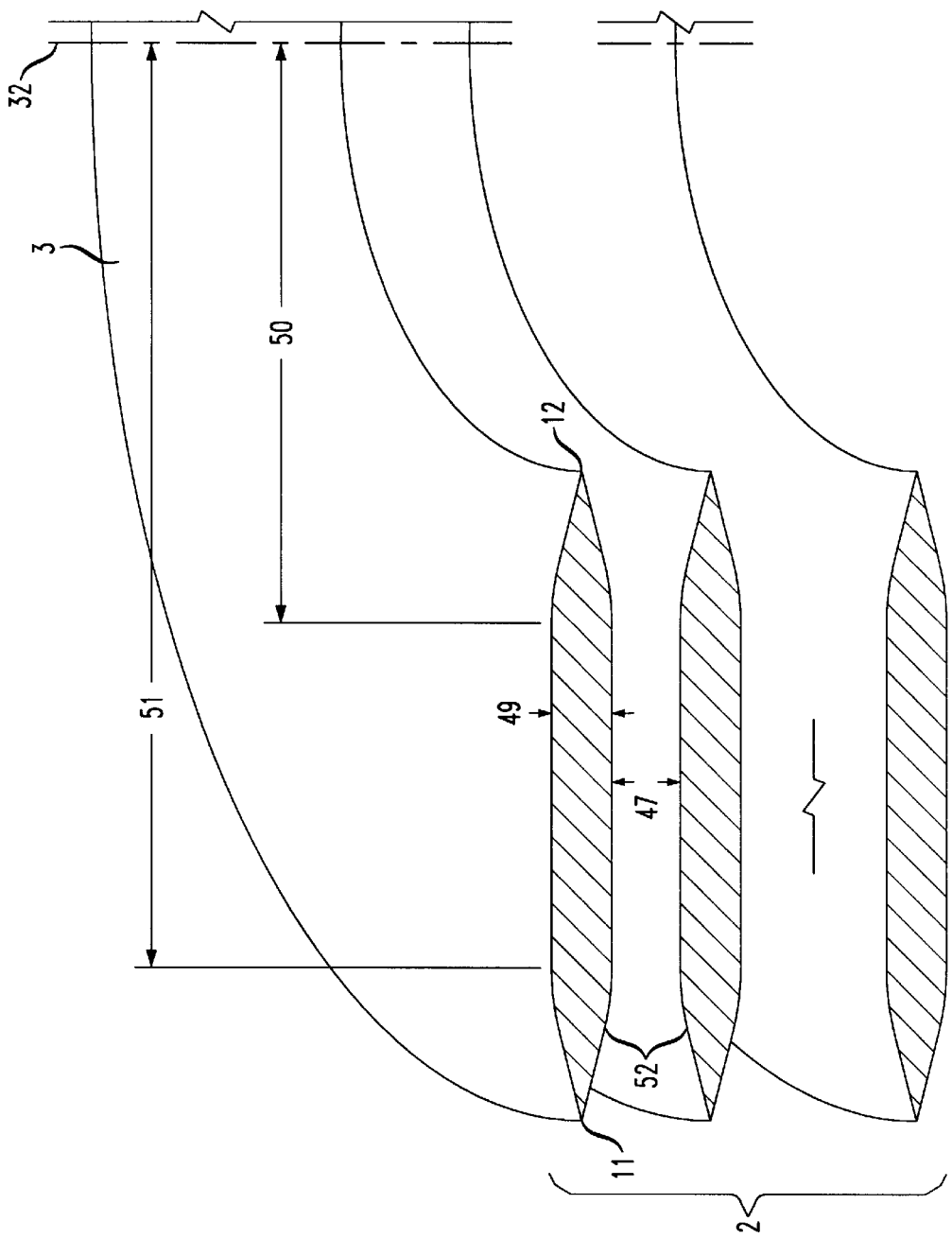
FIG. 10 illustrates adjacent annular disks incorporating diffuser patterns at the inner and outer perimeters of the disks.

In FIG. 10 there is shown an exclusion filter 1 design of the current invention in which the substantially flat annular disks 3 are tapered to improve fluid flow rates through the exclusion filter 1. In order to ensure acceptable fluid flow rates through exclusion filters 1 of the prior art, cylindrical stacks 2 comprising an inconveniently large number of flat annular disks 3 would sometimes be required. Due to difficulties in manufacturing injected molded plastic parts of limited thicknesses, cylindrical stack 2 size is particularly problematic when annular disks 3 are constructed from plastic. Filtering effects similar to those observed through the use of annular disks 3 of uniform thickness (and corresponding uniform inter-disk spacing between adjacent annular disks 3) can be obtained through the use of annular disks 3 which are radially symmetrical but of radially variable thickness (designated annular disks 3 of non-uniform thickness). The use of annular disks 3 of non-uniform thickness, however, can improve fluid flow characteristics between adjacent annular disks 3 and decrease the resistance of fluid flowing between those disks 3, thereby increasing fluid flow rates between each pair of adjacent annular disks 3. The use of annular disks 3 of non-uniform thickness is particularly advantageous when combined with the use of injection molded annular disks 3 or other annular disks 3 not fabricated from sheet stock. The increased flow rates between each pair of adjacent annular disks 3 reduces the number of disks required to achieve the desired flow rate through the exclusion filter 1 as a whole, thereby reducing the height of the cylindrical stack 2 of annular disks 3 required to achieve the desired flow rate through the filter.

When annular disks 3 of non-uniform thickness are used, some minimum inter-disk distance 47 must occur between adjacent annular disks 3 at some particular radial distance from axis of rotation 32. Minimum inter-disk distance 47 can occur at any radial distance from axis of rotation 32 between the outer perimeter 11 and inner perimeter 12 of annular disk 3. The radial distance from axis of rotation 32 at which the minimum inter-disk distance 47 occurs is designated the critical radial distance. The thickness of annular disk 3 at the critical radial distance is also the largest thickness of annular disk 3 and is designated critical thickness 49. Critical thickness 49 need not occur on annular disk 3 at only one particular radial distance. Critical thickness 49 may be maintained on annular disk 3 between an inner critical radial distance 50 and an outer critical annular distance 51. If the critical thickness 49 does only occur on annular disks 3 at one particular critical radial distance, any reference made to inner critical annular distance 50 or to outer critical radial distance 51 is understood to refer to the critical radial distance.

Tapered annular disks 3, or those annular disks 3 in which the thickness of annular disks 3 decreases toward their inner or outer perimeters, represent one type of annular disk 3 of non-uniform thickness. Two types of tapering of annular disks 3 which may be utilized are illustrated in FIG. 10. First, annular disk 3 is tapered toward the outer perimeter 11 of the annular disk 3, so that the thickness of annular disks 3 is smaller at a point located on outer perimeter 11 than at a point on annular disk 3 located at the outer critical radial distance 51. Second, annular disk 3 is also tapered toward the inner perimeter 12 of the annular disk 3, so that the thickness of annular disks 3 is smaller at a point located on inner perimeter 12 than at a point on annular disk 3 located at the inner critical radial distance 50. Though FIG. 10 illustrates tapering toward the inner perimeter 12 and toward the outer perimeter 11, it is to be understood that the invention does not require tapering in both directions, and that tapering in only one direction is also within the scope of the invention. The tapering also need not be monotonic.

Tapering toward the inner or outer perimeter may occur at an even rate, wherein the thickness of annular disk 3 declines steadily as the relevant perimeter is approached, or may occur at an accelerated rate, wherein the thickness of annular disk 3 declines more rapidly as the relevant perimeter is approached. In a preferred embodiment of the invention, also illustrated in FIG. 10, the tapering of annular disks 3 may be so designed as to create a diffuser pattern 52 between adjacent annular disks 3. Though FIG. 10 illustrates the use of a diffuser pattern 52, it is to be understood that other tapering designs are also within the scope of this invention.

The application of exclusion filters 1 to outdoor electronics enclosures and the enhanced exclusion filter 1, and many of the intended advantages of each, will be understood from the foregoing description and it will be apparent that, although the invention and its advantages have been described in detail, various changes, substitutions, and alterations may be made in the form, construction, and arrangement of the parts thereof without departing from the spirit and scope of the invention as defined by the appended claims, or sacrificing its material advantages, the form hereinbefore described being merely a preferred or exemplary embodiment thereof.

What is claimed is:

1. In an exclusion filter wherein a cylindrical stack of a plurality of evenly-spaced annular disks rotates about the cylindrical stack's central axis, the annular disks being substantially flat and having concentric central holes, the annular disk's concentric holes forming a central core, the cylindrical stack having a capped end and an orifice end and having inlet spaces between the annular disks, in which unfiltered fluid enters the cylindrical stack's periphery through the inlet spaces and filtered fluid exits the stack through the orifice end via the central core, wherein the improvement comprises:

the use of annular disks having an inner perimeter, and outer perimeter, and being of non-uniform thickness.

2. The apparatus of claim 1, in which the annular disks further have an outer critical radial distance, the thickness of the annular disks being tapered toward the outer perimeter, so that the thickness of the annular disks at the outer perimeter is less than the thickness of the annular disks at the outer critical radial distance.

3. The apparatus of claim 2, in which the tapering toward the outer perimeter of the annular disks forms a diffuser pattern between adjacent annular disks.

4. The apparatus of claim 2, in which the annular disks further have an inner critical radial distance, and the thickness of the annular disks being tapered toward the inner perimeter, so that the thickness of the annular disks at the inner perimeter is less than the thickness of the annular disks at the inner critical radial distance.

5. The apparatus of claim 4 in which the tapering toward the inner perimeter of the annular disks forms a diffuser pattern between adjacent annular disks, and in which the tapering toward the outer perimeter of the annular disks also forms a diffuser pattern between adjacent annular disks.

6. The apparatus of claim 1, in which the annular disks further have an inner critical radial distance, the thickness of the annular disks being tapered toward the inner perimeter, so that the thickness of the annular disks at the inner perimeter is less than the thickness of the annular disks at the inner critical radial distance.

7. The apparatus of claim 6, in which the tapering toward the inner perimeter of the annular disks forms a diffuser pattern between adjacent annular disks.

* * * * *